United States Patent
Kumar et al.

(10) Patent No.: US 10,372,744 B2
(45) Date of Patent: Aug. 6, 2019

(54) DITA RELATIONSHIP TABLE BASED ON CONTEXTUAL TAXONOMY DENSITY

(71) Applicant: International Business Machines Corporation, Armonk, NY (US)

(72) Inventors: Balaji S. Kumar, Bangalore (IN); Vishal G. Palliyathu, Bangalore (IN); Harpreet Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 15/172,249

(22) Filed: Jun. 3, 2016

(65) Prior Publication Data

US 2017/0351755 A1    Dec. 7, 2017

(51) Int. Cl.
| | |
|---|---|
| *G06F 16/954* | (2019.01) |
| *G06F 16/36* | (2019.01) |
| *G06Q 10/10* | (2012.01) |
| *G06F 16/38* | (2019.01) |

(52) U.S. Cl.
CPC ............ *G06F 16/367* (2019.01); *G06F 16/38* (2019.01); *G06F 16/954* (2019.01); *G06Q 10/10* (2013.01)

(58) Field of Classification Search
CPC ...... G06F 16/367; G06F 16/38; G06F 16/954; G06F 16/27; G06F 16/9535; G06F 16/958; G06Q 30/02; G06Q 30/0247; G06Q 30/0254; G06Q 30/0256; G06Q 30/0273; G06Q 30/0277
USPC ........................................................ 707/794
See application file for complete search history.

(56) References Cited

U.S. PATENT DOCUMENTS

| | | | |
|---|---|---|---|
| 8,127,225 B2 | 2/2012 | Petri | |
| 2005/0278164 A1* | 12/2005 | Hudson | ............... G06F 17/2785 704/4 |
| 2007/0250487 A1* | 10/2007 | Reuther | ............... G06F 16/367 |
| 2009/0210861 A1 | 8/2009 | Alupului | |
| 2009/0254572 A1* | 10/2009 | Redlich | ................. G06Q 10/06 |
| 2009/0271711 A1 | 10/2009 | Hartshorn et al. | |

(Continued)

FOREIGN PATENT DOCUMENTS

WO    2012171165 A1    12/2012

OTHER PUBLICATIONS

Don Day, Darwin Information Typing Architecture (DITA), Dec. 1, 2010, OASIS, Version 1.2, ALL document.*

(Continued)

*Primary Examiner* — Jay A Morrison
*Assistant Examiner* — Antonio J Caiado
(74) *Attorney, Agent, or Firm* — Kristofer L. Haggerty (57) ABSTRACT

A computer scans a DITA library to identify DITA topic files. The computer then determines whether the identified DITA file has a concept, task, or reference scheme. Based on determining that the identified DITA topic file has a concept scheme, the computer generates a subject taxonomy. Based on determining that the identified DITA topic file has a task scheme, the computer generates a navigation taxonomy. Based on determining that the identified DITA topic file has a reference scheme, the computer generates a command relational taxonomy. Based on the generated subject, navigation, and command relational taxonomies, the computer generates a DITA file relationship table based on the contextual taxonomy density of the aforementioned taxonomies.

11 Claims, 3 Drawing Sheets

(56) References Cited

U.S. PATENT DOCUMENTS

| | | | |
|---|---|---|---|
| 2010/0030552 A1* | 2/2010 | Chen | G06F 17/30734 704/9 |
| 2010/0250497 A1* | 9/2010 | Redlich | F41H 13/00 707/661 |
| 2010/0312769 A1* | 12/2010 | Bailey | G06F 16/95 707/740 |
| 2011/0161312 A1* | 6/2011 | Wallman | G06F 17/2235 707/722 |
| 2011/0252066 A1* | 10/2011 | Alterman | G06Q 30/02 707/794 |
| 2012/0215602 A1* | 8/2012 | Ramer | G06F 17/30867 705/14.13 |
| 2012/0221953 A1* | 8/2012 | Alterman | G06Q 30/02 715/733 |
| 2012/0290950 A1* | 11/2012 | Rapaport | H04L 51/32 715/753 |
| 2013/0212111 A1* | 8/2013 | Chashchin | G06F 17/30707 707/740 |
| 2014/0074869 A1 | 3/2014 | Petrone | |
| 2014/0129213 A1* | 5/2014 | Kimelfeld | G06F 17/271 704/9 |
| 2014/0149413 A1* | 5/2014 | Longo | G06F 16/367 707/737 |
| 2014/0195896 A1 | 7/2014 | Caten | |
| 2015/0186364 A1* | 7/2015 | Nelson | G06F 17/30011 707/722 |
| 2016/0275152 A1* | 9/2016 | Gunjan | G06F 16/355 |
| 2017/0031894 A1* | 2/2017 | Bettersworth | G06F 17/277 |
| 2017/0091207 A1* | 3/2017 | Kumar | G06F 16/2228 |

OTHER PUBLICATIONS

IBM, Introduction to the Darwin Information TypingArchitecture, Sep. 28, 2005, IBM, ALL document.*

Tratz et al. A Taxonomy, Dataset, and Classifier for Automatic Noun Compound Interpretation, 2010, University of Southern California, all pages. (Year: 2010).*

Soto et al. Similarity-Based Support for Text Reuse in Techincal Writing, 2015, Dalhousie University, all pages. (Year: 2015).*

Anonymous, "Integrated Editor for DITA Topics and Ditamaps," an IP.com Prior Art Database Technical Disclosure, IP.com No. IPCOM000239197D, electronic publication date Oct. 20, 2014, http://ip.com/IPCOM/000239197, 9 pgs.

IBM, "Introduction to the Darwin Information on Typing Architecture," http://www.ibm.com/developerworks/library/x-dita1, Sep. 28, 2005 (first published Mar. 1, 2001), 12 pgs, © IBM Corporation, 2001, 2005.

IBM, "IBM Microelectronics Innovates with a DITA-based Information Strategy," https://www.youtube.com/watch?v=2C4gPnRkLCM, uploaded Nov. 10, 2011, 3 pgs.

Wikipedia, "Darwin Information Typing Architecture," https://en.wikipedia.org/wiki/Darwin_Information_Typing_Architecture, 5 pgs., printed Mar. 9, 2016 1:44 PM.

* cited by examiner

DITA RELATIONSHIP TABLE BASED ON CONTEXTUAL TAXONOMY DENSITY

BACKGROUND

The present invention relates generally to technical documentation, and more particularly to establishing relationships between Darwin Information Typing Architecture (DITA) files based on contextual taxonomy density. As is the case with many emerging products, a consumer must often times read an instruction manual and/or practice application of a product to attain a proficiency in said product, sometimes referred to as a learning curve. As the rate at which new products are developed is increased, however, as is the rate at which instructional developers need develop the technical documentation for said products. Similarly, as is the rate at which developers need convey effective instructions for proper use to a consumer. As such, developers have devised an extensible markup language (XML) data model, known as Darwin Information Typing Architecture (DITA), in which segments, or topics, of technical documentation may be stored and recycled for future use, saving time and work for both a developer and a user who is familiar with the recycled documentation/documentation format. Two or more topics which are applicable to a particular product or service may then associated with one another according to a DITA map, which stores both the relevant topics and presentation of the related topics. The topics contained in the DITA map are then output to a user in a desired format, such as a web page HTML or PDF. DITA is an extremely useful data model for quickly developing and publishing technical documentation, so useful in fact that hundreds of thousands, if not millions, of topics have been generated.

SUMMARY

Embodiments of the present invention disclose a method, system, and computer program product for a DITA taxonomy system. A computer scans a DITA library to identify DITA topic files. The computer then determines whether the identified DITA file has a concept, task, or reference scheme. Based on determining that the identified DITA topic file has a concept scheme, the computer generates a subject taxonomy. Based on determining that the identified DITA topic file has a task scheme, the computer generates a navigation taxonomy. Based on determining that the identified DITA topic file has a reference scheme, the computer generates a command relational taxonomy. Based on the generated subject, navigation, and command relational taxonomies, the computer generates a DITA file relationship table based on the contextual taxonomy density of the aforementioned taxonomies.

DETAILED DESCRIPTION

Embodiments of the present invention will now be described in detail with reference to the accompanying figures.

Figure 1:
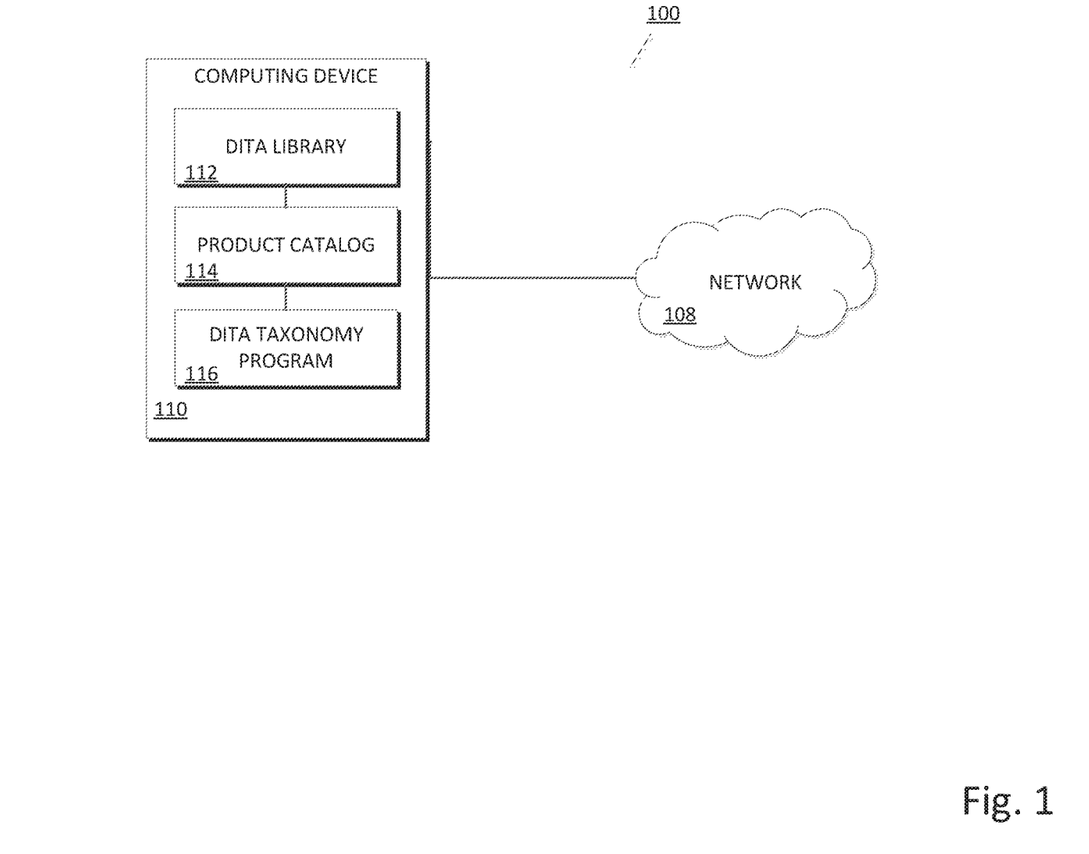
FIG. 1 illustrates a DITA taxonomy system, in accordance with an embodiment of the present invention.

FIG. 1 illustrates a DITA taxonomy system 100, in accordance with an embodiment of the invention. In the example embodiment, DITA taxonomy system 100 includes computing device 110 and network 108.

In the example embodiment, network 108 may be the Internet, representing a worldwide collection of networks and gateways to support communications between devices connected to the Internet. Network 108 may include, for example, wired, wireless, or fiber optic connections. In other embodiments, network 108 may be implemented as an intranet, a local area network (LAN), or a wide area network (WAN). In general, network 108 can be any combination of connections and protocols that will support communications between computing device 110 and other computing devices.

In the example embodiment, computing device 110 includes DITA library 112, product catalog 114, and DITA taxonomy program 116. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 3.

In the example embodiment, DITA library 112 is an organized collection of data detailing DITA topic files (.dita extension) and DITA map files (.ditamap extension). In the example embodiment, DITA topic files are files detailing an associated product (or deliverable) and each DITA topic includes a title element, a prolog element for metadata, a body element, and a short description. DITA topics are categorized into three basic types based on scheme: concept topics, task topics, and reference topics. Schemes are a way to define the structure, content, and to some extent, the semantics of documents. Topics having a concept scheme, or concept topic files, are files detailing objective, broad level information, such as definitions, rules, and guidelines. Topics having a task scheme, or task topic files, are files detailing a procedure that describes how to accomplish a task, often times listing a series of steps that a user follows in order to produce an intended outcome. Topics having a reference scheme, or reference topic files, are files detailing command syntax, programming instructions, and other reference material. Topics stored within DITA library 112 are not mutually exclusive to a single product and, therefore, are often times written without regard to a specific product such that the DITA topics can be recycled for later use in other, similar deliverables. Furthermore, multiple DITA topics can be associated with one another to form a complete deliverable using what is known as a DITA map. A DITA map is a file which details and points to the particular DITA topic files associated with a particular deliverable or product. The DITA map is then referenced when the associated deliverable is selected for output and the contents of the DITA topic files pointed to by the DITA map are loaded in real time (up to date edits) for the deliverable. In the example embodiment, output formats include common formats such as portable document viewer (PDF), hypertext markup language (HTML), extensible hypertext markup language (XHTML), compressed HTML help (.chm), and rich text format (RTF). In addition, a single DITA map may be published in multiple output formats and any number of times.

In the example embodiment, product catalog 114 is an organized collection of data detailing products or deliverables of a business. In the example embodiment, the products detailed by product catalog 114 are associated with DITA map files and corresponding DITA topics stored in DITA library 112.

In the example embodiment, DITA taxonomy program 116 is a program on computing device 110 which is capable of scanning a DITA library, such as DITA library 112, to extract DITA topics and DITA maps. Furthermore, DITA taxonomy program 116 is capable of determining whether a DITA topic is formatted in a concept, task, or reference scheme. DITA taxonomy program 116 is further capable of extracting a subject taxonomy from a concept scheme DITA topic file, extracting a navigation taxonomy from a task scheme DITA topic file, and extracting a command relational taxonomy from a reference scheme DITA topic file. Based on the extracted subject taxonomy, navigation taxonomy, and command relational taxonomy, DITA taxonomy program 116 is further capable of calculating a contextual taxonomy density and generating a DITA relationship table.

Figure 2:
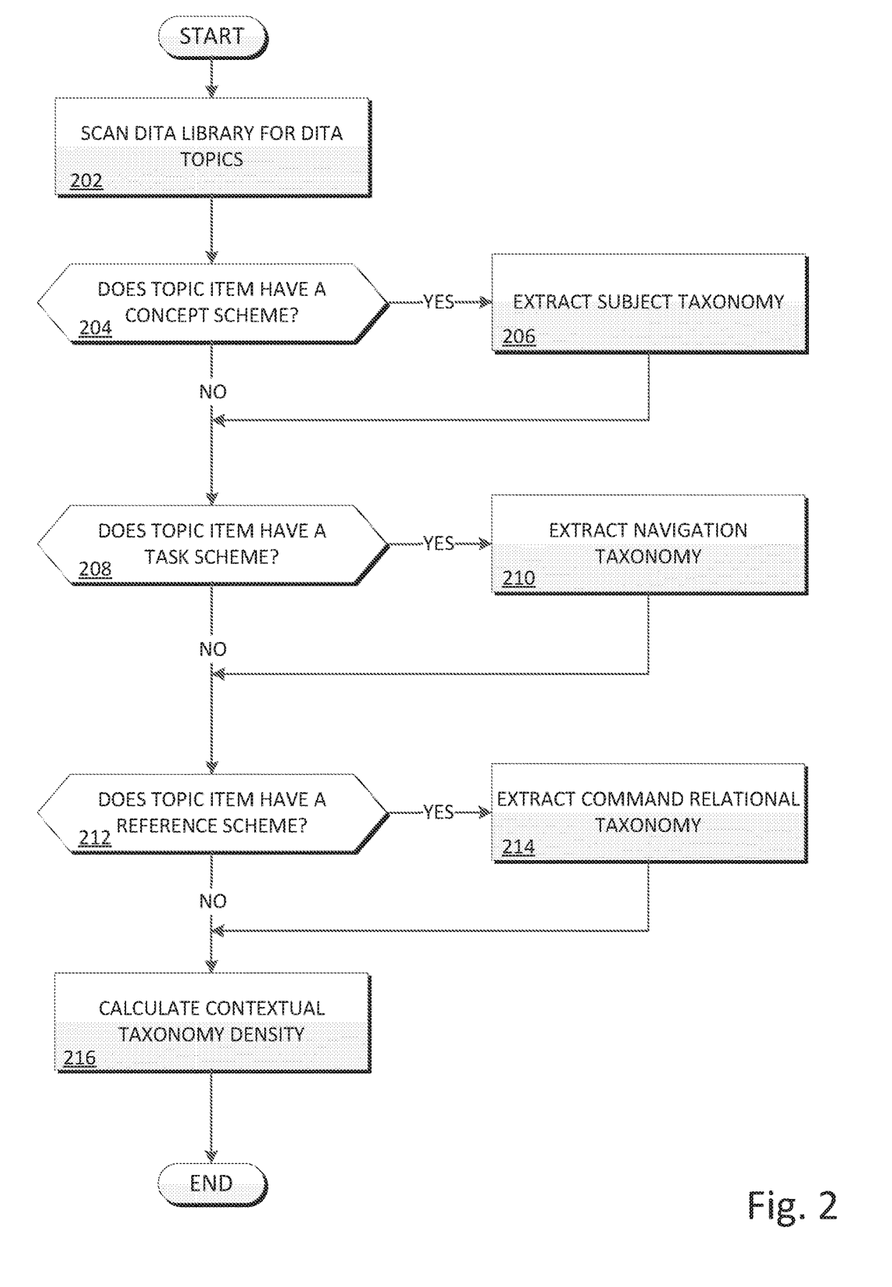
FIG. 2 is a flowchart illustrating the operation of the DITA taxonomy program of FIG. 1 in identifying relationships between DITA files, in accordance with an embodiment of the present invention.

FIG. 2 is a flowchart depicting the operation of DITA taxonomy program 116 in generating a DITA relationship table based on the contextual taxonomy density of DITA topic files within DITA library 112. In the example embodiment, DITA taxonomy program 116 establishes associations between related DITA topic files by identifying commonalities between DITA topic files of different schemes. Such commonalities allow a user to quickly and efficiently locate related topic files when generating DITA maps, such as instruction manuals and other technical documentation, for deliverables. Topics stored in DITA library 112 are categorized by their schema, which include concept, task, and reference topics, and related topics are linked together using a DITA map. A basic example of a DITA map including a concept, task, and reference topic can easily be illustrated by a paragraph describing a grilled cheese sandwich: "Grilled cheese sandwiches are easy and delicious sandwiches that require very few ingredients, however allow for a plethora of variations. A delicious grilled cheese sandwich can be made using only 1 teaspoon butter, 2 slices of bread, and 1 slice of cheese. Start by melting the butter in a medium sized pan at medium-high heat. Once the butter is melted, lay one slice of bread followed by the slice of cheese and lastly the other slice of bread. Heat both sides until crispy and brown. For other variations and optional ingredients, check out of list of recommended cheeses and breads here."

If the preceding guide was broken down into concept, task, and reference tasks, then the concept topic would include "Grilled cheese sandwiches are easy and delicious sandwiches that require very few ingredients, however allow for a plethora of variations." In addition, the task topic would include "A delicious grilled cheese sandwich can be made using only 1 teaspoon butter, 2 slices of bread, and 1 slice of cheese. Start by melting the butter in a medium sized pan at medium-high heat. Once the butter is melted, lay one slice of bread followed by the slice of cheese and lastly the other slice of bread. Heat both sides until crispy and brown." Lastly, the reference topic would include "For other variations and optional ingredients, check out of list of recommended cheeses and breads here."

With reference to FIG. 2, DITA taxonomy program 116 scans DITA library 112 for DITA topics and DITA maps (step 202). In the example embodiment, a user selects one or more libraries to scan for DITA topic files and DITA map files via a user interface of DITA taxonomy program 116. DITA taxonomy program 116 identifies DITA topics by searching for files extensions and formats specific to DITA topic files, such as files with a ".dita" extension. Similarly, DITA taxonomy program 116 identifies DITA map files by identifying file extensions and formats associated with DITA map files, such as files ending with a ".ditamap" extension. Having identified the DITA topics and DITA maps within a selected database, DITA taxonomy program 116 then stores the DITA files themselves, the contents of the DITA file, or pointers to the DITA files within DITA taxonomy program 116 for future use.

DITA taxonomy program 116 determines whether the identified DITA topic has a concept scheme (decision 204). As explained earlier, concept schemes detail broad level information such as definitions, rules and guidelines. In the example embodiment, DITA taxonomy program 116 determines whether the identified DITA topic file has a concept scheme by analyzing the structure of the file. DITA files follow a defined structure to promote consistency across concept topic files and improve recyclability, regardless of drafter. Therefore, concept topic files follow a predefined structure which DITA taxonomy program 116 is capable of identifying. In the example embodiment, concept topic files include a <concept> element which includes a <title>, <conbody>, and other optional elements such as <titlealts>, <shortdesc>, <prolog>, and <related-links>. The <conbody> element further may include paragraphs, tables, charts, sections, examples, and other elements generally associated with the body element of a general topic. For example, if DITA taxonomy program 116 searches DITA library 112 for concept topic files based on identifying topic files with a concept scheme, DITA taxonomy program 116 may identify the concept topic files illustrated below in Table 1.

TABLE 1

Topic Files of DITA Library 112 having a Concept Scheme (Concept Topic Files)

| Topic Files having a Concept Scheme |
| --- |
| Transient data Queue |
| Transient data Queue services |
| CICS region |
| Life cycle of a CICS region |
| CICS startup process |
| CICS shutdown process |
| CICS resource definitions |

If DITA taxonomy program 116 determines that an identified DITA topic file has a concept scheme (decision 204 "YES" branch), then DITA taxonomy program 116 extracts a subject taxonomy (step 206). In the example embodiment, DITA taxonomy program 114 extracts a subject taxonomy from the concept topic file by first extracting a list of nouns corresponding to product names and/or product features detailed by product catalog 114. In the example embodiment, nouns are identified through the use of natural language processing techniques and by referencing a resource such as a dictionary or relational database. The identified nouns are then summed and the nouns which are most commonly used are extracted. In the example embodiment, the most commonly used nouns are defined as the top 50% of the identified nouns. For example, if ten nouns are identified in product catalog 114, then the five nouns which are most frequently used are considered the most commonly used nouns. In other embodiments, the most commonly used nouns may be identified as nouns used more than a threshold amount of times or by other means. DITA taxonomy program 116 then compares the list of most commonly used nouns from product catalog 114 with the topic titles and short descriptions of the DITA topics identified as concept topic files to extract a subject taxonomy. Continuing the example above where Table 1 illustrates the concept topic files identified by DITA taxonomy program 116, if Table 2 details the commonly used nouns of product catalog 114 identified by DITA taxonomy program 116, then DITA taxonomy program 114 compares the nouns in Tables 1 and 2 to determine the subject taxonomy detailed by Table 3 (italics added to emphasize matches).

TABLE 1

Topic Files of DITA Library 112 having
a Concept Scheme (Concept Topic Files)
Topic Files having a Concept Scheme Transient data Queue
Transient data Queue services
CICS region
Life cycle of a CICS region
CICS startup process
CICS shutdown process
CICS resource definitions

TABLE 2

Most Commonly used Nouns within Product Catalog 114
Product Catalog 114

Transient data Queue
CICS
CICS region
CICS resource definitions

TABLE 3

Subject Taxonomy
Subject Taxonomy

*Transient data Queue*
*Transient data Queue* services
*CICS region*
Life cycle of a *CICS region*
*CICS* startup process
*CICS* shutdown process
*CICS resource definitions*

After extracting a subject taxonomy (step 206) or determining that the identified topic does not have a concept scheme (decision 204 "NO" branch), DITA taxonomy program 116 determines whether the identified topic has a task scheme (decision 208). As described earlier, topics having a task scheme, or task topic files, are files detailing a procedure that describes how to accomplish a task, often times listing a series of steps that a user follows in order to produce an intended outcome. Similar to the manner in which DITA taxonomy program 116 determines whether the identified topic uses a concept scheme, DITA taxonomy program 116 determines whether the identified topic has a task scheme by analyzing the structure of the file. DITA files follow a defined structure to promote consistency across concept topic files and improve recyclability, regardless of drafter. Therefore, task topic files follow a predefined structure which DITA taxonomy program 116 is capable of identifying. In the example embodiment, task topic files include a <task> element which includes a <title>, <taskbody>, and other optional elements such as <titlealts>, <shortdesc>, <prolog>, and <related-links>. The <taskbody> element has a very specific structure with the following elements in the following order: <prereq>, <context>, <steps>, <result>, <example>, and <postreq>. Continuing the example above, if DITA program 116 searches DITA library 112 for task topic files based on identifying topic files with a task scheme, then DITA taxonomy program 116 identifies the task topic files illustrated below in Table 4.

TABLE 4

Topic Files of DITA Library 112 having
a Task Scheme (Task Topic Files)
Topic Files having a Task Scheme Starting a CICS region
Stopping a CICS region
Modifying a CICS region
Deleting a CICS region
Destroying a CICS region
Setting up the Transient data Queue
Configuring the Transient data Queue
Deleting the Transient data Queue
Shutting down a CICS region
Shutting down a CICS region using cicscp stop region command
Shutting down a CICS region using cicscp stop all command
Shutting down SFS using cicscp stop sfs_server command
Shutting down a CICS region using the administation console
Shutting down a CICS region using the CEMT PERFORM shutdown
Shutting down a CICS region using EXEC CICS PERFORM shutdown
Adding a resource definitions
Modifying a resource definitions
Installing resource definitions from the permanent database
Installing a group of resource definitions
Deleting resource definitions from the runtime database If DITA taxonomy program 116 determines that the identified topic has a task scheme (decision 208 "YES" branch), then DITA taxonomy program 116 extracts a navigation taxonomy (step 210). In the example embodiment, DITA taxonomy program 116 extracts a navigation taxonomy from the task topic by first extracting gerunds/verbs from the International Business Machines (IBM) Navigation Guidelines, however in other embodiments, a similar set of navigation guidelines may be referenced. The IBM Navigation Guidelines are templates for generating task topic files which seek to help writers, editors, and information architects establish greater consistency across IBM information centers. The navigation guidelines establish principles of effective navigation tree design and place emphasis on structuring information for reuse. Because a task topic often incorporate steps or a procedure to follow, the IBM Navigation Guidelines provide sample gerunds which are commonly used in published steps of a deliverable, such as "starting," "stopping," "installing," "configuring," etc. DITA taxonomy program 116 then determines the most commonly used gerunds within the IBM Navigation Guidelines in a similar manner to that of determining the commonly used nouns within the database detailing product catalog 114 above. DITA taxonomy program 116 then compares the commonly used gerunds to gerunds found in the identified task topic(s). In the example embodiment, DITA taxonomy program 116 identifies gerunds in the titles and short descriptions of a task topic by applying techniques such as natural language processing and optical character recognition in conjunction with reference to a resource such as a dictionary or relational database. Those gerunds/verbs which are commonly used within the IBM Navigation Guidelines that match the titles and short descriptions of the task topic form the navigation taxonomy. Continuing the example above, if Table 4 details the task topic files identified in DITA library 112 and Table 5 details the commonly used gerunds found in the IBM Navigation Guidelines, then DITA taxonomy program 116 compares the gerunds in Tables 4 and 5 to extract the navigation taxonomy detailed by Table 6 (italics added for to emphasize matches).

TABLE 4

Topic Files of DITA Library 112 having
a Task Scheme (Task Topic Files)
Topic Files having a Task Scheme Starting a CICS region
Stopping a CICS region
Modifying a CICS region
Deleting a CICS region
Destroying a CICS region
Setting up the Transient data Queue
Configuring the Transient data Queue
Deleting the Transient data Queue
Shutting down a CICS region
Shutting down a CICS region using cicscp stop region command
Shutting down a CICS region using cicscp stop all command
Shutting down SFS using cicscp stop sfs_server command
Shutting down a CICS region using the administation console
Shutting down a CICS region using the CEMT PERFORM shutdown
Shutting down a CICS region using EXEC CICS PERFORM shutdown
Adding a resource definitions
Modifying a resource definitions
Installing resource definitions from the permanent database
Installing a group of resource definitions
Deleting resource definitions from the runtime database

TABLE 5

Commonly used Verbs within the IBM Navigation Guidelines
IBM Navigation Guidelines + Verbs Starting
Stopping
Modifying
Deleting
Destroying
Setting Up
Configuring
Shutting down
Adding
Installing

TABLE 6

Navigation Taxonomy
Navigation Taxonomy

*Starting* a CICS region
*Stopping* a CICS region
*Modifying* a CICS region
*Deleting* a CICS region
*Destroying* a CICS region
*Setting up* the Transient data Queue
*Configuring* the Transient data Queue
*Deleting* the Transient data Queue
*Shutting down* a CICS region
*Shutting down* a CICS region using cicscp stop region command
*Shutting down* a CICS region using cicscp stop all command
*Shutting down* SFS using cicscp stop sfs_server command
*Shutting down* a CICS region using the administation console
*Shuttin down* a CICS region using the CEMT PERFORM shutdown
*Shutting down* a CICS region using EXEC CICS PERFORM shutdown
*Adding* a resource definitions
*Modifying* a resource definitions
*Installing* resource definitions from the permanent database
*Installing* a group of resource definitions
*Deleting* resource definitions from the runtime database After extracting a navigation taxonomy (step 210) or determining that the identified topic does not have a task scheme (decision 208 "NO" branch), DITA taxonomy program 116 determines whether the identified topic has a reference scheme (decision 212). As described above, topics having a reference scheme, or reference topic files, are files detailing command syntax, programming instructions, and other reference material. Similar to the manner in which DITA taxonomy program 116 determines whether the identified topic has a concept or task scheme, DITA taxonomy program 116 determines whether the identified topic has a reference scheme by analyzing the structure of the file. DITA files follow a defined structure to promote consistency across concept topic files and improve recyclability, regardless of drafter. Therefore, reference topic files follow a predefined structure which DITA taxonomy program 116 is capable of identifying. In the example embodiment, reference topic files include a <reference> element which includes a <title>, <refbody>, and other optional elements such as <titlealts>, <shortdesc>, <prolog>, and <related-links>. Content within the <refbody> element is limited to tables, property lists, syntax sections, and generic sections and examples. Continuing the example above, if DITA taxonomy program 116 searches DITA library 112 for reference topic files based on identifying topic files having a reference scheme, then the identified reference topic files are illustrated below in Table 7.

TABLE 7

Topic Files of DITA Library 112 having
a Reference Scheme (Reference Topic Files)
Reference Scheme Cicscp stop region - shutting down a CICS region
Cicscp stop all - shutting down a CICS region
Cicscp stop sfs_server command
CEMT PERFORM shutdown
PERFORM shutdown SPI command
Transient data Queue examples
Transient data Queue services command
Resource definitions affecting programs, transactions
Resource definitions If DITA taxonomy program 116 determines that the identified topic has a reference scheme (decision 212 "YES" branch), then DITA taxonomy program 116 extracts a command relational taxonomy (step 214). In the example embodiment, DITA taxonomy program 116 extracts a command relational taxonomy by first extracting a listing of the commands which are included in the command tags. Command tags are embedded within DITA files to represent commands and are delineated with a <cmd></cmd> tag. For example, a DITA file may contain the paragraph <p> You can start an ABC computation engine using the <cmd>EXECMD</cmd> command. </p>. In addition to extracting the commands listing, DITA taxonomy program 116 also extracts verbs and nouns from the topic titles and short descriptions of the identified reference topic files in a manner similar to the methods detailed above. The extracted commands, verbs, and nouns form the command relational taxonomy. Continuing the example above, if DITA taxonomy program 116 searches the reference topic files detailed by Table 7 for commands, gerunds, verbs, and nouns, then DITA taxonomy program 116 extracts the command relational taxonomy illustrated by Table 8 (italics added for emphasis).

TABLE 8

Command Relational Taxonomy
Command Relational Taxonomy

Transient data Queue examples
Transient data Queue services command
*Cicscp stop region* - shutting down a CICS region
*Cicscp stop all* - shutting down a CICS region TABLE 8-continued Command Relational Taxonomy
Command Relational Taxonomy

*Cicscp stop sfs_server command*
*CEMT PERFORM shutdown*
*PERFORM shutdown SPI* command
Resource definitions affecting programs, transactions
Resource definitions After extracting a command relational taxonomy (step 214) or determining that the identified topic item does not have a reference scheme (decision 212 "NO" branch), DITA taxonomy program 116 calculates a contextual taxonomy density (step 216). In the example embodiment, the contextual taxonomy density identifies commonalities between the various taxonomies and topic files. These commonalities are then used to associate related DITA topics with one another to aid in quickly and efficiently generating DITA maps for deliverables.

In order to calculate a contextual taxonomy density, DITA taxonomy program 116 first compares the subject taxonomies detailed by Table 3 with the navigation taxonomy detailed by Table 6. If one or more of the identified nouns of a concept topic within the subject taxonomy matches, or is substantially similar to, one or more nouns of a task topic within the navigation taxonomy, then DITA taxonomy program 116 stores an association between the matching DITA topics. Such a comparison may include determining whether an amount of characters in concept topic match a threshold amount of characters in a task topic, for example. Continuing the example above, if DITA taxonomy program 116 compares the concept topic files detailed by Table 3 with the task topic files detailed by Table 6, then DITA taxonomy program 116 creates the associations between the subject taxonomy and navigation taxonomy (horizontal association) illustrated by Table 9 (described in greater detail below).

TABLE 9

Associations between Subject and Navigation Taxonomies

| Subject Taxonomy | File Name | Navigation Taxonomy | File Name |
|---|---|---|---|
| CICS region | c1.dita | *Starting* a CICS region | t1.dita |
| Life cycle of a *CICS region* | c2.dita | *Stopping* a CICS region | t2.dita |
| CICS startup process | c3.dita | *Modifying* a CICS region | t3.dita |
| | | *Deleting* a CICS region | t4.dita |
| | | *Destroying* a CICS region | t5.dita |
| Transient data Queue | c4.dita | *Setting up* the Transient data Queue | t6.dita |
| Transient data Queue services | c5.dita | *Configuring* the Transient data Queue | t7.dita |
| | | *Deleting* the Transient data Queue | t8.dita |
| CICS shutdown process | c6.dita | *Shutting down* a CICS region using cicscp stop region command | t9.dita |
| | | *Shutting down* a CICS region using cicscp stop all command | t10.dita |
| | | *Shutting down* SFS using cicscp stop sfs_server command | t11.dita |
| | | *Shutting down* a CICS region using the administation console | t12.dita |
| | | *Shuttin down* a CICS region using the CEMT PERFORM shutdown | t13.dita |
| | | *Shutting down* a CICS region using EXEC CICS PERFORM shutdown | t14.dita |
| CICS resource definitions | c7.dita | *Adding* a resource definitions | t15.dita |
| | | *Modifying* a resource definitions | t16.dita |
| | | *Installing* resource definitions from the permanent database | t17.dita |
| | | *Installing* a group of resource definitions | t18.dita |
| | | *Deleting* resource definitions from the runtime database | t19.dita |

Note that in Table 9 the associations are made horizontally in groups based on noun commonalities. Referencing Table 9, concept topic file c1.dita is associated with task topic files t1.dita, t2.dita, t3.dita, t4.dita, and t5.dita because all files contain the noun commonality "CICS region." Similarly, c2.dita and c3.dita are associated with task topic files t1.dita, t2.dita, t3.dita, t4.dita, and t5.dita for the same reason and the same is true vice versa (t1.dita is associated with c1.dita, c2.dita, and c3.dita; t2.dita is associated with c1.dita, c2.dita, and c3.dita; etc.). Each group of commonalities is separated by a vertical blank, for example, the empty horizontal gap of cells vertically between "CICS region" matches and the next group of matches, "transient data queue." Again referencing Table 9, DITA taxonomy program 116 identified commonalities between the concept topic files and task topic files above based on the noun commonalities "CICS region," "transient data queue," "CICS shutdown process," and "resource definitions."

DITA taxonomy program 116 next compares the concept topic files detailed by the subject taxonomy (Table 3) with the reference topic files detailed by the command relational taxonomy (Table 8). Similarly, DITA taxonomy program 116 stores an association between matching nouns within concept DITA topics and nouns within reference DITA topics. Continuing the example above, if DITA taxonomy program 116 compares the task topic files detailed by the subject taxonomy (Table 3) with the reference topic files detailed by the command relational taxonomy (Table 8), then DITA taxonomy program 116 creates the associations between the subject taxonomy and navigation taxonomy illustrated by Table 10.

TABLE 10

Associations between Subject and Command Relational Taxonomies

| Subject Taxonomy | File Name | Command Relational Taxonomy | File Name |
|---|---|---|---|
| *Transient data Queue* | c4.dita | *Transient data Queue* examples | r1.dita |
| *Transient data Queue* services | c5.dita | *Transient data Queue* services command | r2.dita |

Note that in Table 10, commonalities between the subject taxonomy and command relational taxonomy within DITA library 112 are limited to the noun commonality "transient data queue."

DITA taxonomy program 116 lastly compares the task topic files of the navigation taxonomy (Table 6) with the reference topic files of the command relational taxonomy (Table 8). If a gerund/verb of a task topic matches, or is substantially similar to, a gerund/verb of a reference topic, DITA taxonomy program 116 creates an association between the two DITA topics. Continuing the example above, if DITA taxonomy program 116 compares the task topic files of the navigation taxonomy (Table 6) with the reference topic files of the command relational taxonomy (Table 8), then DITA taxonomy program 116 creates the associations between DITA topics of the navigation and command relational taxonomies illustrated by Table 11.

TABLE 11

Associates between Navigation and Command Relational Taxonomies

| Navigation Taxonomy | File Name | Command Relational Taxonomy | File Name |
|---|---|---|---|
| *Shutting down* a CICS region using cicscp stop region command | t9.dita | *Cicscp stop region* - shutting down a CICS region | r3.dita |
| *Shutting down* a CICS region using cicscp stop all command | t10.dita | *Cicscp stop all* - shutting down a CICS region | r4.dita |
| *Shutting down* SFS using cicscp stop sfs_server command | t11.dita | *Cicscp stop sfs_server command* | |
| *Shutting down* a CICS region using the administation console | t12.dita | | |
| *Shuttin down* a CICS region using the CEMT PERFORM shutdown | t13.dita | *CEMT PERFORM shutdown* | r5.dita |
| *Shutting down* a CICS region using EXEC CICS PERFORM shutdown | t14.dita | *PERFORM shutdown SPI command* | r6.dita |

Note that in Table 11, commonalities between the navigation taxonomy and command relational taxonomy are limited to the gerund "shutting down."

DITA taxonomy program 116 then consolidates the results into a DITA relationship table (step 216 cont'd.). Continuing the example above, if DITA taxonomy program 116 consolidates the results of the taxonomy densities into a relationship table, then DITA taxonomy program 116 generates the relationship table illustrated below by Table 12.

TABLE 12

DITA Relationship Table

| Subject Taxonomy | File Name | Navigation Taxonomy | File Name | Command Relational Taxonomy | File Name |
|---|---|---|---|---|---|
| *CICS* region | c1.dita | *Starting* a CICS region | t1.dita | | |
| Life cycle of a *CICS region* | c2.dita | *Stopping* a CICS region | t2.dita | | |
| *CICS* startup process | c3.dita | *Modifying* a CICS region | t3.dita | | |
| | | *Deleting* a CICS region | t4.dita | | |
| | | *Destroying* a CICS region | t5.dita | | |
| *Transient data Queue* | c4.dita | *Setting up* the Transient data Queue | t6.dita | *Transient data Queue* examples | r1.dita |
| *Transient data Queue* services | c5.dita | *Configuring* the Transient data Queue | t7.dita | *Transient data Queue* services command | r2.dita |
| | | *Deleting* the Transient data Queue | t8.dita | | |
| *CICS* shutdown process | c6.dita | *Shutting down* a CICS region using cicscp stop region command | t9.dita | *Cicscp stop region* - shutting down a CICS region | r3.dita |
| | | *Shutting down* a CICS region using cicscp stop all command | t10.dita | *Cicscp stop all* - shutting down a CICS region | r4.dita |

TABLE 12-continued

DITA Relationship Table

| Subject Taxonomy | File Name | Navigation Taxonomy | File Name | Command Relational Taxonomy | File Name |
|---|---|---|---|---|---|
| | | *Shutting down* SFS using cicscp stop sfs_server command | t11.dita | *Cicscp stop sfs_server command* | |
| | | *Shutting down* a CICS region using the administation console | t12.dita | | |
| | | *Shuttin down* a CICS region using the CEMT PERFORM shutdown | t13.dita | *CEMT PERFORM shutdown* | r5.dita |
| | | *Shutting down* a CICS region using EXEC CICS PERFORM shutdown | t14.dita | *PERFORM shutdown SPI* command | r6.dita |
| CICS resource definitions | c7.dita | *Adding* a resource definitions | t15.dita | Resource definitions affecting programs, transactions | r7.dita |
| | | *Modifying* a resource definitions | t16.dita | Resource definitions | r8.dita |
| | | *Installing* resource definitions from the permanent database | t17.dita | | |
| | | *Installing* a group of resource definitions | t18.dita | | |
| | | *Deleting* resource definitions from the runtime database | t19.dita | | |

Table 12 above illustrates the associations between taxonomies of different schemes. Such associations are helpful in efficiently developing DITA maps which detail related DITA topics. For example, if a user wanted to develop a DITA map for a deliverable regarding CICS resource definitions, then the user references Table 12 to compile concept topic c7.dita, task topic t15.dita, and resource topic r7.dita into a DITA map detailing CICS resource definitions. While Table 12 only shows a small sample of associations made between DITA topics within DITA library 112, such functionality can be applied to millions of DITA topics, the results of which may then be queried, filtered, and displayed.

Figure 3:
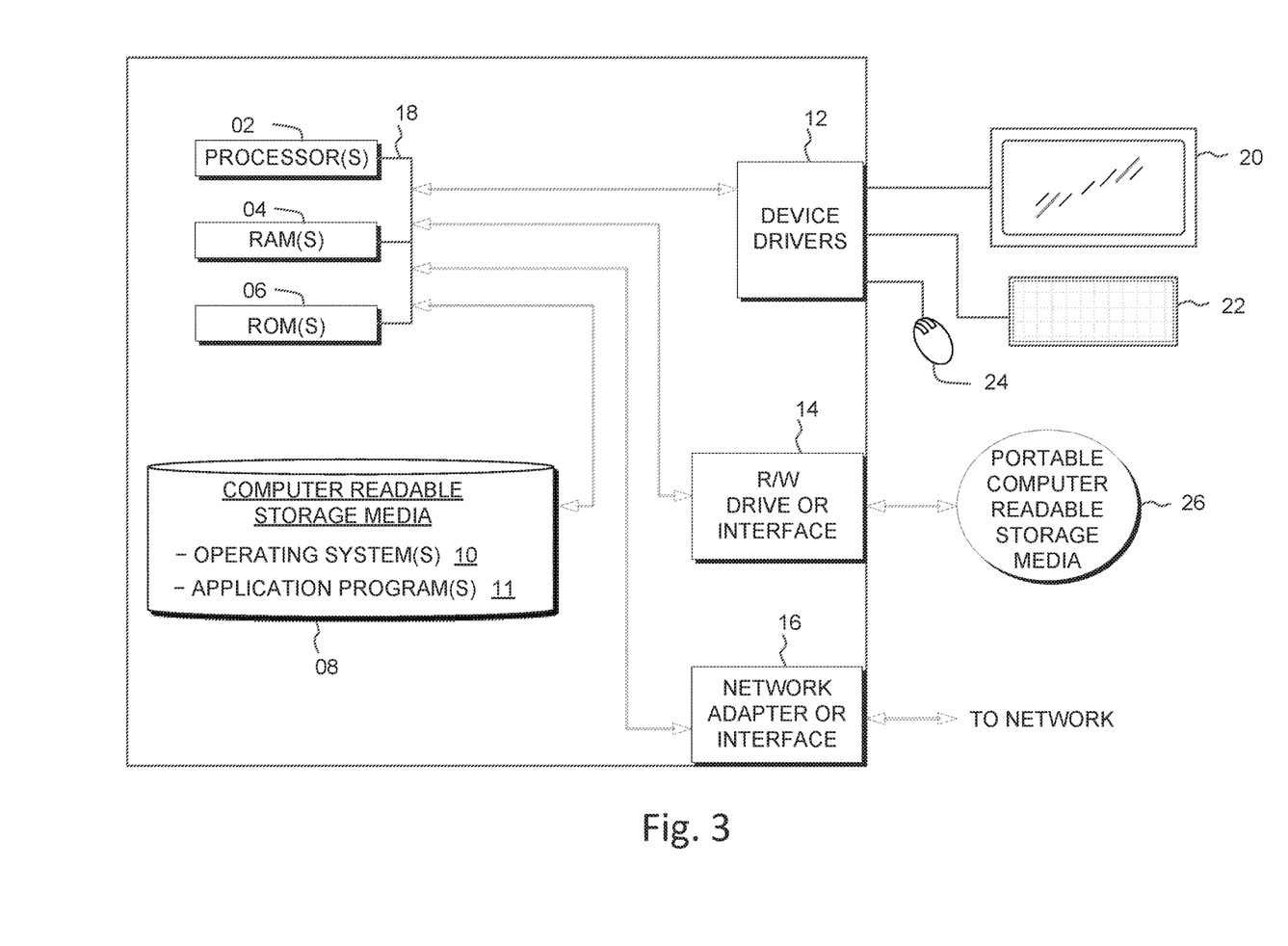
FIG. 3 is a diagram graphically illustrating the hardware components of the DITA taxonomy system of FIG. 1, in accordance with an embodiment of the invention.

FIG. 3 depicts a block diagram of components of computing device 110 of a DITA taxonomy system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example, DITA taxonomy program 116, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on computing device 110 may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on computing device 110 may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A computer implemented method for a Darwin Information Type Architecture (DITA) taxonomy system, the method comprising:
   generating a subject taxonomy based on comparing one or more concept nouns included in one or more concept topic files to one or more nouns included in a product database, wherein generating the subject taxonomy further comprises:
      extracting the one or more concept nouns detailed by at least one of a topic title and a description associated with the one or more concept topic files;
      extracting the one or more nouns included in the product database;
      identifying one or more most frequently used nouns of the one or more nouns included in the product database;
      comparing the one or more concept nouns to the one or more most frequently used nouns; and
      determining that at least one concept noun of the one or more concept nouns is included in the one or more nouns;
   generating a navigation taxonomy based on comparing one or more task verbs included in one or more task topic files to one or more verbs included in a navigation guideline database, wherein generating the navigation taxonomy further comprises:
      extracting the one or more task verbs detailed by at least one of a topic title and a description associated with the one or more task topic files;
      extracting the one or more verbs included in the navigation guideline database, wherein the navigation guideline database details templates for generating task topics;
      comparing the one or more task verbs to the one or more verbs; and
      determining that at least one task verb of the one or more task verbs is included in the one or more verbs;
   generating a command relational taxonomy based on identifying one or more reference command tags, one or more reference verbs, and one or more reference nouns included in one or more reference topic files; and
   generating a relationship table based on identifying one or more commonalities between the subject taxonomy and the navigation taxonomy, and the command relational taxonomy.

2. The method of claim 1, wherein generating the command relational taxonomy further comprises:
   extracting the one or more reference nouns detailed by at least one of a topic title and a description associated with the one or more reference topic files;
   extracting the one or more reference verbs detailed by at least one of a topic title and a description associated with the one or more reference topic files; and
   extracting the one or more reference commands detailed by one or more command tags associated with the one or more reference topic files.

3. The method of claim 2, wherein generating the relationship table further comprises:
   determining that an amount of characters within the at least one concept noun that match an amount of characters within the at least one task verb exceeds a threshold amount;
   determining that an amount of characters within the at least one task verb that match an amount of characters within at least one of the one or more reference nouns, the one or more reference verbs, or the one or more reference commands exceeds a threshold amount;
   determining that an amount of characters within the at least one concept noun that match an amount of characters within the at least one of the one or more reference nouns, the one or more reference verbs, or the one or more reference commands exceeds a threshold amount; and
   generating a relationship table which groups together the subject taxonomy, the navigation taxonomy, and the command relational taxonomy based on the at least one concept noun, the task verb, and the at least one of the one or more reference nouns, the one or more reference verbs, or the one or more reference commands.

4. The method of claim 3, wherein the relationship table is at least one of searchable, filterable, and sortable.

5. A computer program product for a Darwin Information Typing Architecture (DITA) taxonomy system, the computer program product comprising:
   one or more computer-readable storage media and program instructions stored on the one or more computer-readable storage media, the program instructions causing one or more processors to perform a computer implemented method comprising:
   generating a subject taxonomy based on comparing one or more concept nouns included in one or more concept topic files to one or more nouns included in a product database, wherein generating the subject taxonomy further comprises:
      extracting the one or more concept nouns detailed by at least one of a topic title and a description associated with the one or more concept topic files;
      extracting the one or more nouns included in the product database;
      identifying one or more most frequently used nouns of the one or more nouns included in the product database;
      comparing the one or more concept nouns to the one or more most frequently used nouns; and
      determining that at least one concept noun of the one or more concept nouns is included in the one or more nouns;
   generating a navigation taxonomy based on comparing one or more task verbs included in one or more task topic files to one or more verbs included in a navigation guideline database, wherein generating the navigation taxonomy further comprises:
      extracting the one or more task verbs detailed by at least one of a topic title and a description associated with the one or more task topic files;
      extracting the one or more verbs included in the navigation guideline database, wherein the navigation guideline database details templates for generating task topics;
      comparing the one or more task verbs to the one or more verbs; and
      determining that at least one task verb of the one or more task verbs is included in the one or more verbs;
   generating a command relational taxonomy based on identifying one or more reference command tags, one or more reference verbs, and one or more reference nouns included in one or more reference topic files; and generating a relationship table based on identifying one or more commonalities between the subject taxonomy and the navigation taxonomy, and the command relational taxonomy.

6. The computer program product of claim 5, wherein generating the command relational taxonomy further comprises:
   extracting the one or more reference nouns detailed by at least one of a topic title and a description associated with the one or more reference topic files;
   extracting the one or more reference verbs detailed by at least one of a topic title and a description associated with the one or more reference topic files; and
   extracting the one or more reference commands detailed by one or more command tags associated with the one or more reference topic files.

7. The computer program product of claim 6, wherein generating the relationship table further comprises:
   determining that an amount of characters within the at least one concept noun that match an amount of characters within the at least one task verb exceeds a threshold amount;
   determining that an amount of characters within the first at least one task verb that match an amount of characters within at least one of the one or more reference nouns, the one or more reference verbs, or the one or more reference commands exceeds a threshold amount;
   determining that an amount of characters within the at least one concept noun that match an amount of characters within the at least one of the one or more reference nouns, the one or more reference verbs, or the one or more reference commands exceeds a threshold amount; and
   generating a relationship table which groups together the subject taxonomy, the navigation taxonomy, and the command relational taxonomy based on the at least one concept noun, the task verb, and the at least one of the one or more reference nouns, the one or more reference verbs, or the one or more reference commands.

8. The computer program product of claim 7, wherein the relationship table is at least one of searchable, filterable, and sortable.

9. A computer system for a Darwin Information Typing Architecture (DITA) taxonomy system, the computer system comprising:
   one or more computer processors, one or more computer-readable storage media, and program instructions stored on one or more of the computer-readable storage media for execution by at least one of the one or more processors, the program instructions, when executed by the at least one of the one or more processors, causing the computer system to perform a method comprising:
   generating a subject taxonomy based on comparing one or more concept nouns included in one or more concept topic files to one or more nouns included in a product database, wherein generating the subject taxonomy further comprises:
      extracting the one or more concept nouns detailed by at least one of a topic title and a description associated with the one or more concept topic files;
      extracting the one or more nouns included in the product database;
      identifying one or more most frequently used nouns of the one or more nouns included in the product database;
      comparing the one or more concept nouns to the one or more most frequently used nouns; and
      determining that at least one concept noun of the one or more concept nouns is included in the one or more nouns;
   generating a navigation taxonomy based on comparing one or more task verbs included in one or more task topic files to one or more verbs included in a navigation guideline database, wherein generating the navigation taxonomy further comprises:
      extracting the one or more task verbs detailed by at least one of a topic title and a description associated with the one or more task topic files;
      extracting the one or more verbs included in the navigation guideline database, wherein the navigation guideline database details templates for generating task topics;
      comparing the one or more task verbs to the one or more verbs; and
      determining that at least one task verb of the one or more task verbs is included in the one or more verbs;
   generating a command relational taxonomy based on identifying one or more reference command tags, one or more reference verbs, and one or more reference nouns included in one or more reference topic files; and
   generating a relationship table based on identifying one or more commonalities between the subject taxonomy and the navigation taxonomy, and the command relational taxonomy.

10. The computer system of claim 9, wherein generating the command relational taxonomy further comprises:
   extracting the one or more reference nouns detailed by at least one of a topic title and a description associated with the one or more reference topic files;
   extracting the one or more reference verbs detailed by at least one of a topic title and a description associated with the one or more reference topic files; and
   extracting the one or more reference commands detailed by one or more command tags associated with the one or more reference topic files.

11. The computer system of claim 10, wherein generating the relationship table further comprises:
   determining that an amount of characters within the at least one concept noun that match an amount of characters within the at least one task verb exceeds a threshold amount;
   determining that an amount of characters within the first at least one task verb that match an amount of characters within at least one of the one or more reference nouns, the one or more reference verbs, or the one or more reference commands exceeds a threshold amount;
   determining that an amount of characters within the at least one concept noun that match an amount of characters within the at least one of the one or more reference nouns, the one or more reference verbs, or the one or more reference commands exceeds a threshold amount; and
   generating a relationship table which groups together the subject taxonomy, the navigation taxonomy, and the command relational taxonomy based on the at least one concept noun, the task verb, and the at least one of the one or more reference nouns, the one or more reference verbs, or the one or more reference commands.

* * * * *